United States Patent
Wong et al.

(10) Patent No.: US 9,357,110 B2
(45) Date of Patent: May 31, 2016

(54) TRACK-MOUNT WIRELESS CAMERA FIXTURE

(71) Applicants: Angie Wong, Pleasanton, CA (US); Ken Nakamura, Fremont, CA (US); Kim Rubin, Menlo Park, CA (US)

(72) Inventors: Angie Wong, Pleasanton, CA (US); Ken Nakamura, Fremont, CA (US); Kim Rubin, Menlo Park, CA (US)

(73) Assignee: Ojo Technology, Inc., Fremont, CA (US)

(*) Notice: Subject to any disclaimer, the term of this patent is extended or adjusted under 35 U.S.C. 154(b) by 442 days.

(21) Appl. No.: 13/972,816

(22) Filed: Aug. 21, 2013

(65) Prior Publication Data

US 2014/0055611 A1     Feb. 27, 2014

Related U.S. Application Data

(60) Provisional application No. 61/693,473, filed on Aug. 27, 2012.

(51) Int. Cl.
| | |
|---|---|
| *H04N 7/173* | (2011.01) |
| *H04N 7/18* | (2006.01) |
| *H04N 5/225* | (2006.01) |
| *G03B 17/00* | (2006.01) |
| *G09G 5/00* | (2006.01) |
| *H04N 5/232* | (2006.01) |
| *F16M 11/10* | (2006.01) |
| *F16M 11/18* | (2006.01) |
| *F16M 11/20* | (2006.01) |
| *F16M 13/02* | (2006.01) |

(52) U.S. Cl.
CPC ............ *H04N 5/2252* (2013.01); *F16M 11/10* (2013.01); *F16M 11/18* (2013.01); *F16M 11/2014* (2013.01); *F16M 13/027* (2013.01); *H04N 5/2251* (2013.01); *H04N 5/232* (2013.01); *Y10T 29/49117* (2015.01)

(58) Field of Classification Search
CPC ....... H04N 7/173; H04N 7/18; H04N 5/2252; H04N 5/225; G03B 17/00; G09G 5/00; G06K 9/00
See application file for complete search history.

(56) References Cited

U.S. PATENT DOCUMENTS

| | | | |
|---|---|---|---|
| 7,520,686 B2 | 4/2009 | Droege | |
| 8,325,232 B2 | 12/2012 | Lee | |
| 8,475,060 B2 | 7/2013 | Chapman | |
| 2003/0117494 A1 | 6/2003 | Poblete | |
| 2006/0251259 A1* | 11/2006 | Renkis | G08B 13/19621 380/270 |
| 2010/0231506 A1* | 9/2010 | Pryor | G01F 23/292 345/156 |

* cited by examiner

*Primary Examiner* — Sath V Perungavoor
*Assistant Examiner* — Patricia I Young
(74) *Attorney, Agent, or Firm* — Kim Rubin Patent Agent

(57) ABSTRACT

A wireless camera fixture adapted to mount on a track, such as a track normally used for overhead lighting fixtures, is described. Embodiments include the use of IEEE 802.11 wireless protocol, the use of a standard track-mount power supply; the use of a two-axis tilt and pan mechanical mount; hardware to permit horizon correction; modifications to a camera enclosure to support an antenna inside the enclosure and access to camera controls; use of multiple antennas; use of a cover plate at the front of the enclosure; use of visible light or infrared light LEDs on the cover plate; configuration to use dual-circuit tracks; use of separate circuits in the track to power the visible light and infrared light LEDs separately. A method of manufacturing the fixture is described.

4 Claims, 6 Drawing Sheets

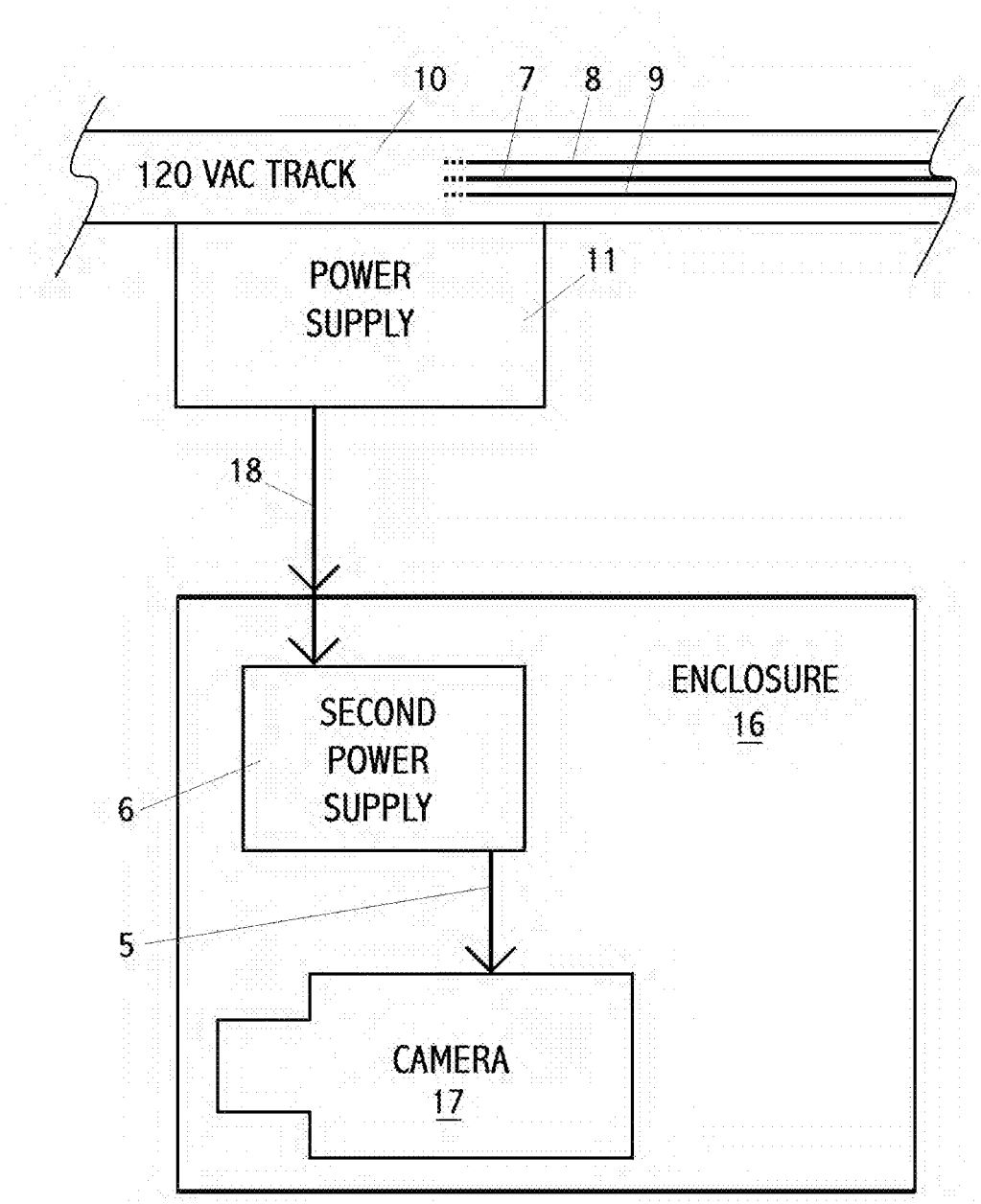

TRACK-MOUNT WIRELESS CAMERA FIXTURE

BACKGROUND OF THE INVENTION

Video cameras for surveillance are widely used in commercial, industrial, office and other environments to provide live and recorded monitoring to provide security and operational information. These cameras, if indoors, are typically mounted permanently on a wall or ceiling. Permanent mounting is a disadvantage for environments that change frequently, such as retail, museums, and modular offices.

One prior art solution is to mount video surveillance cameras on overhead lighting tracks. While this solves the mechanical mounting problem—by using a tool-less, easily moved mount—it does not solve the cabling problem. Traditionally, video surveillance cameras require input power through one cable and provide output video via another cable. Internet Protocol (IP) cameras reduce the number of cables to one, by providing power on dedicated wires within the CAT5 or CAT6 multi-conductor cable. However, prior art track-mount surveillance cameras still require at least one cable, which severely limits the mobility of the camera. In addition, this at least one cable requires a hole in the wall or ceiling. When the camera is removed, either an unsightly hole remains, or must be repaired.

SUMMARY OF THE INVENTION

This invention describes a camera fixture adapted to mount in a track used for track-mounted lighting fixtures. The camera fixture draws its power from the track and uses wireless technology for its output video. The camera fixture may be repointed and moved with the same level of ease as track-mounted light fixtures. No power or video cable is required.

Embodiments of the invention use standard components, originally designed a portions of a track-mount light fixture, as part of the camera. A method of manufacturing such a camera fixture uses such standard components.

An embodiment uses a cover plate so that the camera fixture visually resembles a light fixture.

An embodiment uses an access port at the rear of the enclosure to access key camera adjustments and an optional external antenna connection.

An embodiment uses LED lights as part of the camera fixture to both light a subject and visually disguise the camera as a light fixture.

An embodiment uses infrared (IR) LED lights as part of the camera fixture to provide usable light for the camera in a dark room.

An embodiment uses both visible light and IR light LEDs as part of the camera fixture.

An embodiment uses a second power rail in the track so that lights on the track and camera fixtures on the track may be powered and depowered separately.

An embodiment uses both the primary power rail in the track to power visible light LEDs and the secondary power rail in the track to power the camera fixture and IR LEDs.

Embodiments use variations in the wireless antenna. Embodiments include (i) an antenna entirely within the camera body; (ii) an antenna projecting from the camera body; (iii) an antenna on a short antenna cable, where the antenna is mounted separately from the camera; and (iv) an antenna on a short antenna cable, where the antenna is mounted magnetically on the same track as the camera fixture.

An embodiment uses a first power supply module integrated with mechanical track mounting hardware and a second power supply, which draws its input power from the output of the first power supply. The first power supply mounts on the track and is separate from the camera enclosure. The second power supply is internal in the camera enclosure.

An embodiment uses one or more power supplies internal in the camera enclosure, drawing its input power from the track.

BRIEF DESCRIPTION OF THE DRAWINGS

FIG. 6 shows the connectivity of a second power supply, in one embodiment.

DETAILED DESCRIPTION

Figure 1:
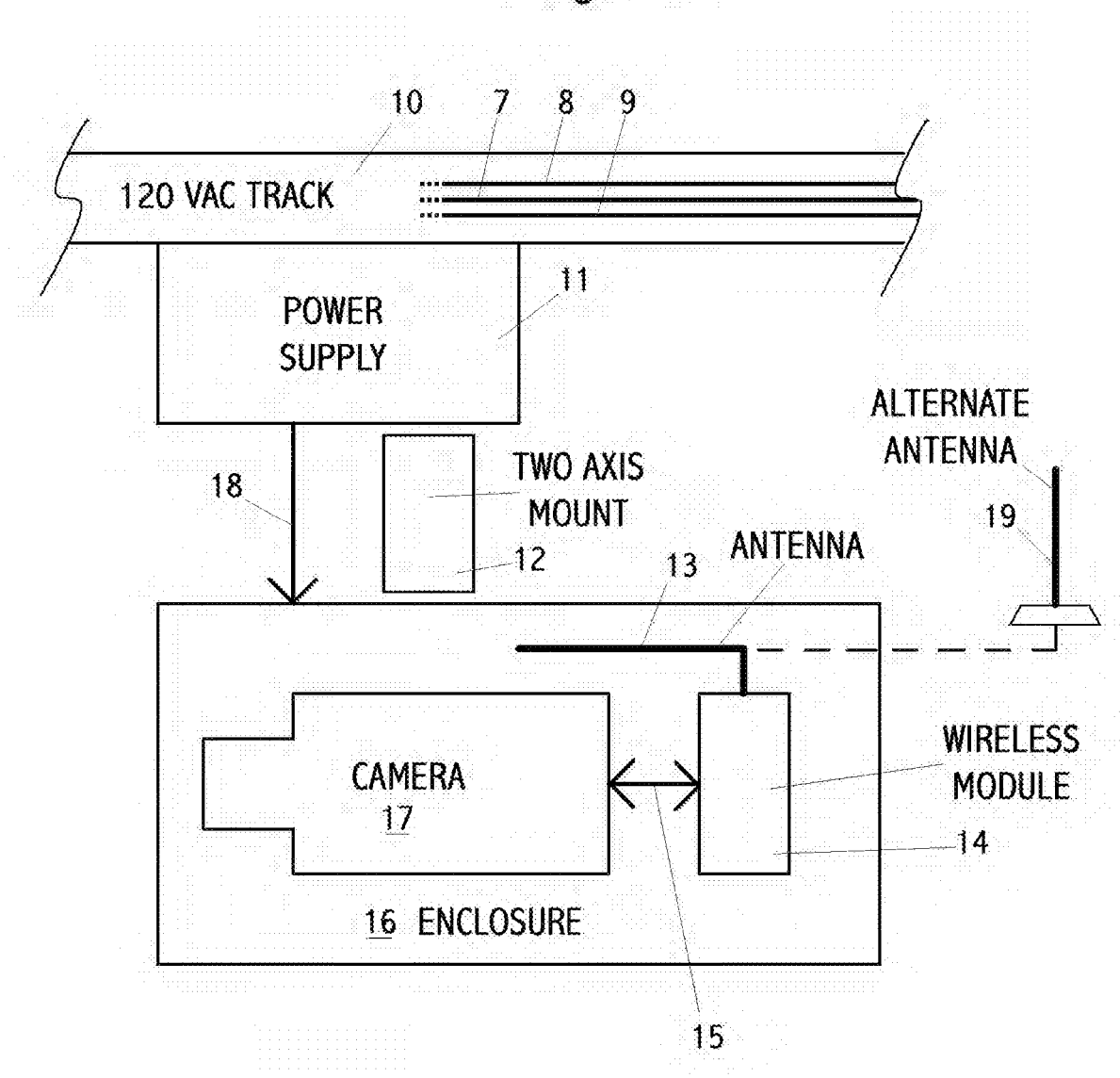
FIG. 1 shows a block diagram of one embodiment of a track-mount camera fixture.

FIG. 1 shows a block diagram of one embodiment of the invention. A mechanical track 10, typically designed for mounting on ceilings or walls, comprise one or two electrical circuits. One-circuit tracks typically have a neutral conductor 7 and a hot conductor 8 running the length of the track. Two circuit tracks typically add a second hot conductor 9. Usually, the two circuits run on the same voltage, such as approximately 120 VAC or 240 VAC, although separate or different voltages are possible. A track could be designed to carry both high voltage AC, such as 120 VAC and low voltage DC, such as 12 VDC, 24 VAC or 44 VDC. A track may also carry control or data information. Such tracks and light fixtures for the tracks are prior art. Many vendors provide such tracks and a variety of light fixtures.

FIG. 1 shows a device of this invention, which in the embodiment shown comprises power supply 11, a two axis mechanical mount 12, an enclosure or enclosure 16 for a camera 17, where the camera 17 uses power via a conductor 18 from the power supply 17, and the camera 17 connects to a wireless module 14 which turn connects to an antenna 13. The mechanical mount 12 is also called a "base" in the claims. The enclosure 16 houses internally the camera 17, the wireless module 14, and the antenna 13. Not shown is an optional second power supply in the enclosure 16 and an optional rotating mount for the camera 17. The antenna 13 may alternatively protrude from the enclosure 16, or may be separate from the enclosure 16 and connect to the wireless module 14 via an antenna cable, not shown. The two-axis mount 12 may alternatively be a single axis mount, or a three-axis mount. The wireless module 14 may be integrated with the video camera or may be integrated with the video camera's electronics. A "video camera connected to a wireless module" includes a video camera with inherent, or optional, wireless capability.

In the embodiment shown in FIG. 1 the power supply 11 is also the mechanical mount for the instant inventive device in the track 10. In an alternative embodiment block 11 is only a mechanical mount, with cable 18 then carrying track power directly to the enclosure 16. The enclosure 16 may also be called a can. A power supply may be a module not shown located in the enclosure 16 or may be internal to the camera 17. A track carrying 24 VAC, 12 VDC, or PoE (power over Ethernet) compatible voltage, as examples, may not require a power supply separate from the camera 17.

In one ideal embodiment, a dual-circuit track is used, with the device of this invention taking its power from a first circuit and any light fixtures installed on the same track taking their power from the second circuit. The two circuits are switched separately, so that a location manager may switch off the lights while leaving the camera fixture on.

Note that the device of this invention is often referred to as a "camera," or "camera fixture," while in addition, a component of the invention is also called a "camera." An example of the later "camera" usage is shown in FIG. 1 as 17. The usage of the term "camera" may be determined from its context in the text or drawing.

Continuing to look at FIG. 1, in one embodiment, the track 10, the power supply 11, and the camera 17 may be standard, off-the-shelf, prior-art components. Other elements shown in FIG. 1 may also be standard components, such as the wireless module 14 or the antenna 13. Note than any of the elements shown in FIG. 1 may be commercial available components. Or, alternatively, any combination including all of the components may be unique to an embodiment of this invention.

A particularly unique and valuable embodiment is to use some standard components, such as track 10 and power supply 11. These components may already be at customer locations. These components may already have regulatory approvals. By reducing high voltage (7, 8, and 9) in the track 10 to low voltage via power supply 11, then providing this low voltage 18 to the enclosure 16, it is possible to provide a regulatory compliant product without separate testing and approval of the device of this invention. By interfacing with standard track 10 it is possible to take advantage of the large installed base of track at potential customer sites.

A unique novelty of this invention is the ability to easily re-locate and re-position the device of this invention without running new wire or cable to the device. Another novelty is re-purposing a module 11 to power a video camera fixture rather than its original intended purpose of powering a light fixture.

There may be a second power supply used in some embodiments, not shown in FIG. 1. For example, the power supply 11 may provide 24 VAC via cable 18 and then a second power supply in the enclosure 16 converts the 24 VAC from the power supply 11 to an appropriate to power the camera 17. An alternative is to use a power filter or conditioner to provide cleaner power to the camera 17 or the wireless module 14. Note that in many cases the track power is electrically noisy, and not suitable for use directly by the camera 17. Note than in many cases a standard power supply 11 supplies unregulated or unfiltered power and is not suitable for use directly by the camera 17.

The camera 17 is a central element of this invention. The camera may be specially designed for this invention, or it may be a standard camera, adapted and configured for use in this invention. A novel embodiment is to use a standard video surveillance camera 17, not originally adapted to be installed in a track-mounted fixture.

The camera 17 may be an analog, digital or IP camera. It may be a video or still camera. It may have special applications, such using IR light or thermal sensors, or motion sensors. A typical embodiment uses an Internet Protocol (IP) digital video surveillance camera, with an internal processor, image sensor and optics to produce images both in visible light ("daylight") and infrared, or IR light ("night"). Such a camera 17 is sometimes designated having "day/night" capability.

One application for this invention is in a museum, retail store, restaurant or other establishment to place the camera for video surveillance purposes. Such establishments often re-arrange the works on display or the location of features in the store. It is therefore highly advantageous for the operator of the establishment to be able to easily move and adjust cameras in response to changes in the establishment, without the need to hire an expert for this purpose. Track light fixtures are designed to have this type of ease-of-use flexibility. However, prior art does not include wireless video camera fixtures adapted for track-powering and track mounting.

A purpose of embodiments of this invention is to provide a level of flexibility for video surveillance devices that is similar to the flexibility of track-mounted light fixtures. This flexibility and convenience does not exist in the prior art. Another purpose of embodiments of this invention is a method of manufacturing video camera fixtures using existing, approved components. Prior art methods require testing and approval by regulatory agencies—process steps that are time consuming and expensive.

The flexibility of placement comprises (1) placement in the establishment in any room that has compatible tracks and wireless radio coverage; (2) placement on any track in the room; (3) aiming the camera fixture as desired; (4) programming camera attributes wirelessly; (5) powering lights on the track separately from any camera fixtures on the track.

Such flexibility comprises the ability to place more than one camera fixture on a track. Aiming the camera comprises one or more combinations of the following mechanical or electronic adjustments: (1) pan (or azimuth); (2) tilt (or elevation); (3) rotation (about the camera's optical axis); and (4) zoom (focal length). Not all embodiments support all such aiming adjustments. There are a large number of programmable camera attributes, typically. Being able to adjust such attributes remotely is a significant benefit of embodiments of this invention. Such adjustments include: exposure; frame rate; masking; motion sensing; data protocols including compression type, compression ratio, or image quality; encryption; camera access credentials; IP and MAC addresses; multiple video-stream management; local video storage; error management; motion detection, and other camera attributes that vary significantly by camera vendor, model, and over time with improvements. Some cameras permit remote mechanical or electronic aiming or mechanical or electronic zoom. For fixtures with integrated lighting, such as IR or visible light, remote access may include light attributes, such as on/off, brightness, or responsiveness to local conditions. A novelty of one embodiment is providing access to one or more of these camera adjustments remotely for a track-mounted re-locatable video camera fixture free of external power or video cables.

In one embodiment, pan and tilt adjustments are provided by a two-axis mount shown in FIG. 1 as 12. One embodiment uses this two-axis mount 12 both as a mechanical support and connection between the track-interface element 11 and the enclosure 16, as well as the mechanism to support two axes of mechanical adjustment. This two-axis mount 12 may be, or may be adapted from, an existing mount whose original purpose is to support a light fixture.

A novel adjustment of an embodiment is horizon correction, or rotation about the optical axis. In this adjustment, sometimes called a "correction," the camera 17 is rotated around its optical axis to produce an effect of rotating the horizon in a camera image, without otherwise changing substantially the camera view. This motion is implemented in one embodiment by the use of a novel mount for the camera, shown as 80 in FIG. 4. This novel mount provides a rotatable joint in the line of the optical axis of the camera 17 (also seen as 86 in FIG. 4). In one embodiment, this mount comprises a screw and threaded receptacle where at least a portion of the mount is interior of the enclosure 16. A novel aspect of this element is the use to implement horizon correction. In one embodiment, the mount comprises a metal L-shaped plate, where the plate mounts onto the camera 17 using a built-in threaded receptacle (not shown) in the camera 17. (A similar threaded receptacle on the other side of the camera 86 is shown as 84 in FIG. 4.) Another portion of the L-shaped plate comprises a threaded receptacle that accepts a threaded bolt through a hole near the center of the rear of the enclosure 16. This hole is shown ad 80 in FIG. 4. In one embodiment, this mount provides both the horizon correction rotation and the physical mechanical mounting connection between the camera 17 (or 84 in FIG. 4) and the enclosure 16. Rotation or horizon correction is effected by loosening a bolt in hole 80 in FIG. 4; rotating the camera 86 in FIG. 4 to the desired horizon angle; then tightening the bolt. This method and elements to implement horizon correction are not restrictive in this invention. The use of such a camera optical axis adjustment permits the camera fixture to be used on tracks mounted on a wall and sloped surfaces, and on ceiling tracks, and permits other orientations of camera mounting and aiming, and variations in target orientation and location.

Alternative ways to mount the camera 17 in the enclosure 16 are possible, and alternative methods, including software, may be used to implement horizon correction.

A wireless module 14 is used to convert the electronic output of the camera, such as IP data, to digital wireless data. An alternative embodiment may use another format of video data, such as analog or USB data. This module 14 may be internal in the camera 17, or be a separate module as shown in FIG. 1, or may be wireless card inserted into a slot in the camera 17. The wireless module 14 may use one or more of many different communication protocols. A popular protocol is IEEE 802.11. An alternative protocol is Bluetooth. An alternative protocol is cellular data, such as 3G, 4G, or LTE.

The wireless module 14 accepts electronic video information from the camera 17 via an electrical interface 15. This interface 15 may be a cable or connector; it may be proprietary or standard interface such as a card slot.

For the wireless camera fixture of this invention to communicate with a recipient, an antenna is required. In addition, reception requires appropriate hardware to receive wireless transmissions, such as an IEEE 802.11 access point or a suitably equipped PC, laptop, tablet, smart phone, cell tower or other device. A mesh network is used in one embodiment where one device of this invention receives and relays data from another device of this invention. Thus, an appropriate wireless receiver may be a device of this invention. It may be possible to use existing access points or it may be necessary to add new access points. Such access points may be shared with a public WiFi network; shared as a private WiFi network; shared with other wireless cameras; or may be dedicated for use with this invention.

One embodiment of an antenna is shown 13 in FIG. 1. This antenna is electrically connected to wireless module 14. An antenna cable may or may not be used. In some embodiments, the wireless module 14 may have a built-in antenna, or even no visible antenna at all, and still be suitable for the use in this invention. If the track-mounted camera is placed close to an access point, no antenna 13 external to the wireless module 14 may be necessary. In some embodiments, the antenna is the enclosure 16, the track 10, or electrical wires, 7, 8, 9, or 18. Wireless antenna technology is well known in the art.

The enclosure 16 may be metal or another material such as plastic, fiberglass, or carbon fiber. In general, wireless communication does not work well through a metal wall. Fixture enclosures are traditionally metal due to the heat generated by incandescent light bulbs. However, via openings in a metal enclosure 16, such as the opening at the front of the enclosure 16, an opening at the back of the enclosure 16 (discussed more below), or ventilation holes in the sides of the enclosure 16, suitable wireless communication may occur, even with the antenna 13 located partially or fully inside the enclosure 16.

Another alternative antenna is shown in FIG. 1 as 19. Such an antenna is outside the enclosure 16. Such an "external" antenna may provide better range, or better bandwidth, for examples, or more reliable communication between the invention and a wireless receiver. Such an external 19 may be connected to the wireless module 14 via a coaxial conductor, which may enter the enclosure 16 through a rear opening provided for this purpose. In one embodiment, the external antenna 19 mounts magnetically on the track 10 or the power supply or its enclosure, 11. The external antenna 19 may have an adjustable base so that the antenna 19 may be positioned optimally, either for communication purpose or for esthetic purposes. In one embodiment, the external antenna 19 is the same color as the track 19 or the ceiling on which the track is installed. In one embodiment, the external antenna 19 is positioned so as to align axially with the track 10. The use of such color and position makes the external antenna 19 difficult to see. While this as clear esthetic advantages, it also has a functional advantage in that some uses of video surveillance cameras are "covert" or "partially covert" in that the camera should be difficult to distinguish as a camera.

In one embodiment the alternate antenna 19 and any connecting wire and antenna mount is considered part of the camera fixture and not an "external cable." A typical mounting distance of the alternate antenna from the enclosure 16 is four inches to six feet. An alternative embodiment is providing a connector on the fixture of this invention for one or more alternative antennas 19. Such a work-around of not providing an antenna as part of an embodiment, while allowing a user of the device to provide his own antenna is an embodiment of this invention. Similarly, providing a location and interface for a wireless module 14, while allowing a user of the device to provide his own wireless module is an embodiment of this invention. Similarly, providing a mount for a video camera lens such that a user of the device may provide his own camera lens is an embodiment of this invention.

A key benefit of this invention is the "disguise" of a video surveillance camera as a common light fixture to permit such covert operation. Making an antenna not visible, such as placing it inside the enclosure 16, or making it blend in with its environment while outside the enclosure, 19, as described above, is a unique and novel benefit of this invention.

We have described five different embodiments of the antenna for the wireless module 14: (a) no antenna at all, or one internal to the wireless module 14; (b) an antenna external to the wireless module 14, but internal to the enclosure 16, or partially in and partially out of the enclosure 16; (c) an external antenna 19; (d) an external antenna 19 that is colored or positioned so as to be minimally visible is use; and (e) providing a connector for a user-provided antenna. One embodiment provides a kit of different antennas so that an installer or end user may select an antenna most appropriate for a particular application, need, or location.

Figure 3:
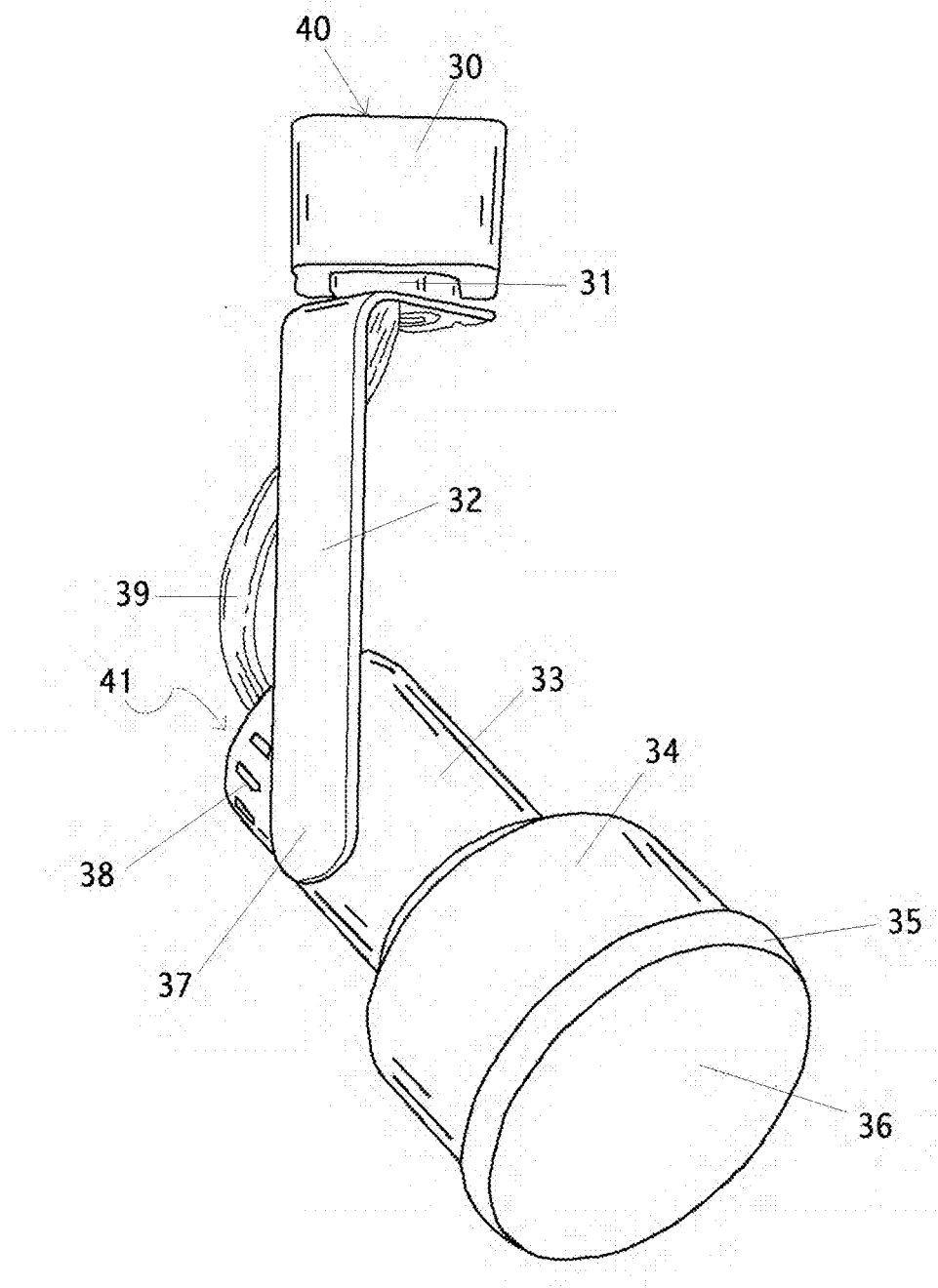
FIG. 3 shows a drawing of one embodiment.

The enclosure 16 is also called the can or housing. It may be generally cylindrical in shape, or may be comprised of two co-axial cylinders of different diameters, as shown in FIG. 3, or may be rectangular, or have other shapes. The "front" of the enclosure 16 is shown on the left in the block diagram in FIG. 1, as the lens of camera 17 is shown schematically looking to the left. If the enclosure 16 is adapted from an original intended use to hold a light bulb, the front of the enclosure 16 is where the light from the bulb would primarily exit the enclosure 16. The rear of the enclosure 16 is shown to the right in FIG. 1. The lens of the camera 17 faces the front of the enclosure 16, and thus the view of the camera is out the front of the enclosure 16.

In an original use for lighting, the rear of the enclosure 16 may be solid, or may be penetrated by the power wire 18, or may have cooling or ventilation holes.

In one embodiment of this invention, a hole, opening, or access port is provided in the rear of the enclosure 16 for multiple purposes. This hole, opening or access port is not shown in FIG. 1. One such purpose is to pass the wireless RF radiation of an internal antenna 13. Another such purpose is to permit an antenna wire from the wireless module 14 to an external antenna 19. Another such purpose is to provide physical access to the rear of the camera 17. Features on the rear of the camera may include: (a) indicators; (b) option switches; (c) test ports such as "video out;" (d) focus and zoom adjustments; (e) wireless module features; or (f) other camera or wireless module features. Another such purpose is to provide access to the mechanical horizon correction adjustment, as discussed above. Another such purpose is to improve cooling of the electronics within the enclosure 16, such as the camera 17, wireless module 14, and an optional second power supply or power filter (shown as 84 in FIG. 4).

The front of the enclosure 16 may have a cover plate, discussed below and shown in FIG. 2.

Figure 2:
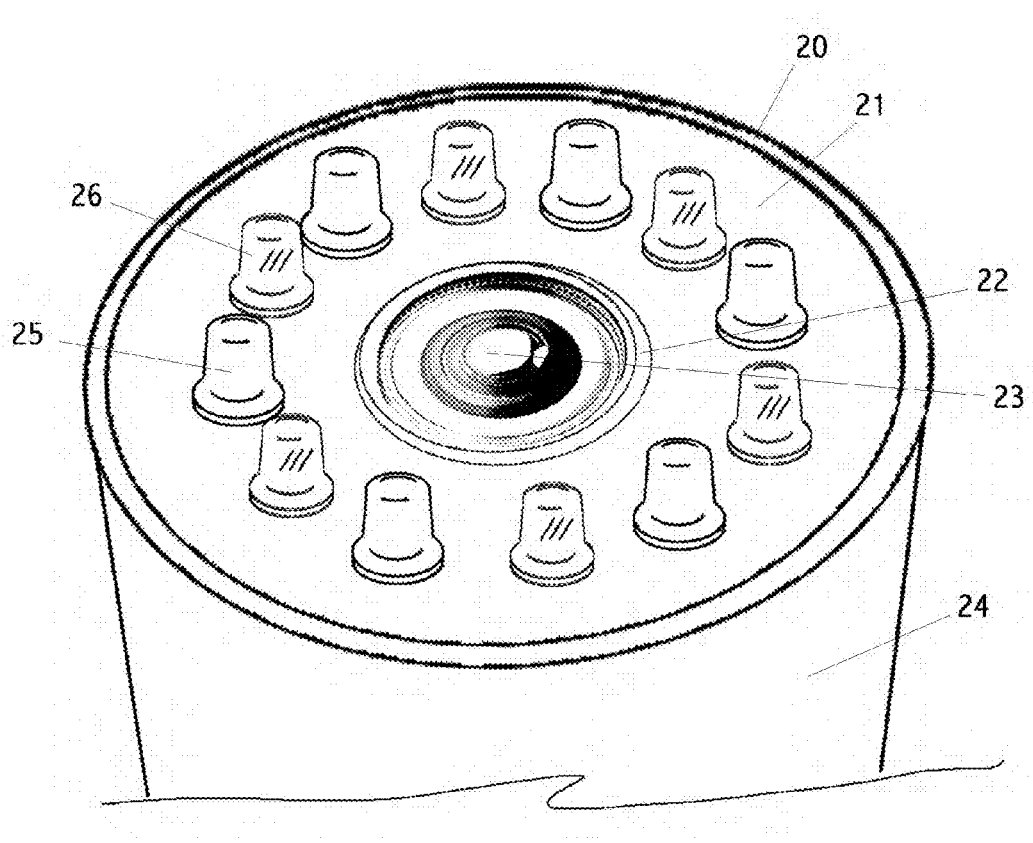
FIG. 2 shows an embodiment of a cover plate with visible light and IR LEDs.

FIG. 2 shows one embodiment of a cover plate. The cover plate is typically placed at the front of the enclosure 24. It comprises a hole 22 for the camera lens view. The cover plate 21 may be metal or plastic or other material. One purpose of the cover plate 21 is to hide the camera and other components in the can. Such hiding is for both esthetic purposes and to permit the invention to be used for covert or semi-covert operation. In one embodiment the cover plate is black. With a black cover plate and a black camera lens, the invention does not appear to be or comprise a camera, except upon careful or close-up inspection.

FIG. 2 shows one embodiment, comprising a cover plate, 21, that removably snap fits into the rim 20 of the enclosure 24. 22 shows a round hole in the center of the cover plate 21. The camera lens 23 is shown through the hole. Ideally, the hole is just large enough for the front of the camera lens, plus mechanical clearance. The camera lens 23 may be flush with the cover plate 21, may sit behind the cover plate, or may protrude from the cover plate. It is convenient to be able to install and remove the cover plate easily with no tools or a minimum of tools.

FIG. 2 shows some alternative embodiments of this invention that comprise LEDs. Although in one embodiment, this invention comprises no included lighting, lighting may be combined with a camera in the same track-mounted fixture of embodiments of this invention. A benefit of this is to reduce the total number of total fixtures necessary in an application. Convenience, reduced capital cost, reduced maintenance costs and improved visual appearance of the installation environment are all benefits of these embodiments. An additional benefit of combining light generating elements, such as incandescent bulbs, LEDs, compact fluorescent, or other light sources, is the enhanced covert nature of the invention. For example, when visible light LEDs 25 (six are shown in FIG. 2) are illuminated, from a reasonable viewing distance it is impossible to see the camera lens 23 due to the blinding effect of the LEDs. In addition, since the fixture is generating light, there is less reason to suspect another purpose of the fixture, such as housing a camera. In addition, the LEDs provide light for the camera to see.

FIG. 2 shows yet another embodiment. Here, six infrared (IR) LEDs are shown, 26. These IR LEDs produce light in the infrared portion of the spectrum that is either dim for humans, such as at 800-880 nm, or not visible ("covert") to for humans, such as at 920-990 nm. However, the camera is sensitive to light at these IR wavelength frequencies. These IR LEDs permit to camera to "see in the dark." There are several benefits and uses for this embodiment. First, lights in a facility may be turned off when the facility is not in use, such as when a restaurant or museum is closed. However, the IR LEDs permit the camera to see effectively, maintaining the security benefit of an operating video surveillance camera. IR LEDs are more energy efficient, with respect to having enough light for camera operation, than visible light sources. Thus, there is a second benefit of IR LEDs: less power. Such less power not only saves money, but also may permit a facility to be LEED certified while still having operating video surveillance. A third benefit of IR LEDs is the ability to operate fully covert. That is, in the dark, where the camera and its light source(s) are not visible at all.

Continuing with FIG. 2, in one novel embodiment, the power for the visible light LEDs, 25, comes from the same track circuit that power other visible light fixtures on the track, while the power for the IR LEDs comes from the same track circuit that power the camera. The IR LEDs may have a controller (not shown) that only turns them on when they are needed, or they may stay on all the time. In this way, the visible light LEDs, 25, operate similarly to the other visible light fixtures installed on the track.

In FIG. 2, six white light LEDs, 25, are alternately spaced with six IR LEDs, 26. Many other arrangements of LEDs or other lighting sources are possible.

In one embodiment, different cover plates are offered to permit an installer or end user to select a cover plate most appropriate to a particular application, need, or location.

The LEDs may mount behind the cover plate, or mounted in front of the cover plate, or may be mounted on the cover plate itself. For example, the cover plate may be a black circuit board, with the electronic LEDs mounted directly on the circuit board. Surface mount LEDs may be used. FIG. 2 shows traditional "through-hole" LEDs for visual clarity in the drawing. Power for the LEDs may be provided by a power connector or cable on the rear of the cover plate. Secondary optics for the LEDs may be used, or not.

FIG. 3 shows one embodiment of this invention. The power supply and mechanical mounting component is 30. The track mates to surface 40. Not visible in FIG. 3 are the electrical pins protruding from surface 40 that mate to the power conductors in a track. Joint 31 permits pan. Bracket 32 supports the enclosure 33 and 34 and provides the tilt motion via rotating joint 37. Power from the power supply 30 flows through the low voltage power cord 39 into the rear 41 of the enclosure 33. The rear 41 of the enclosure portion 33 also had an opening, not visible, as described above. Ventilation holes 38 also permit wireless RF to pass the enclosure portion 33, as discussed above. FIG. 3 shows the enclosure comprised of two components of different diameters, 33 and 34. However, the enclosure may be in the approximate shape of a single cylinder, or not cylindrical at all. A rim or lip of the enclosure is shown 35. This lip supports, in this embodiment, a cover plate 36. The cover plate 36 is shown in more detail in FIG. 2, and is discussed above.

Figure 4:
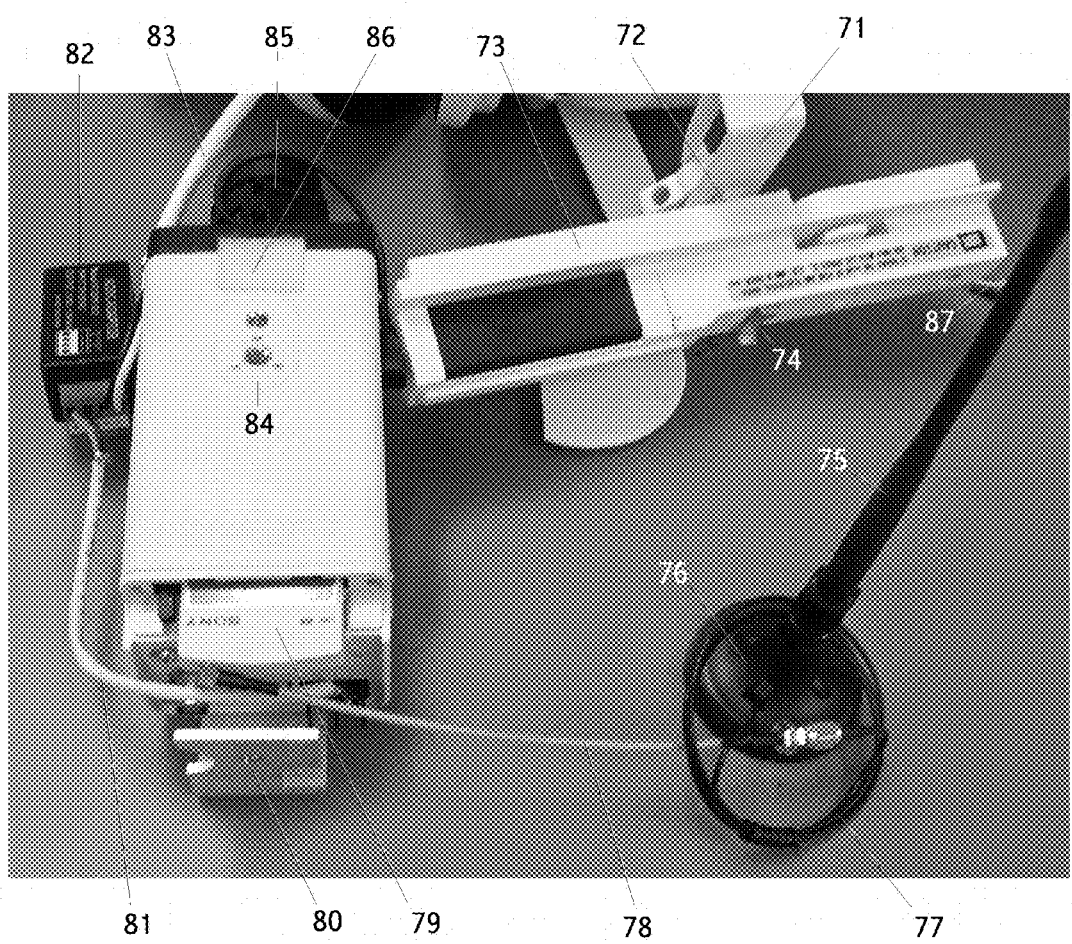
FIG. 4 shows some components of an embodiment, disassembled.

FIG. 4 shows some of the components of an embodiment of this invention, disassembled in this photographic view. 71 is the mounting bracket from the power supply 73 to the enclosure. 72 shows a rotational bearing for "pan" of the camera. The enclosure is not shown in FIG. 4. 73 is the track voltage power supply and mechanical mount to the track. It converts the 120 VAC into 24 VAC. 74 is one contact pin for a high voltage rail in the track. A second contact pin, for the neutral rail, is not visible in this FIG. 75 is an external antenna. 76 is the adjustable, magnetic base for this antenna. The antenna 75 may be rotated on the base 76. The base 76 may be magnetically placed and moved on a track. 77 is the antenna cable from the antenna to the wireless module. Note that this cable is variable length. A connector is shown between cable 77 and cable 78, permitting antennas to be swapped without having to access components inside the can, such as the wireless module 79. 78 is a short cable in the range of ½ inch to six feet, or in the range of 6 inches to 36 inches, that connects directly to the wireless module 79. It uses a small connector to the wireless module 79, shown at the left end of cable 78. This is not the same connector type that connects cable 78 to 77. 80 shows the novel "L" shaped mounting plate that allows the camera 86 to be mounted in the enclosure (not shown). Note the threaded hole visible on the mounting plate 80. This hole is used both for mounting with bolt 87 and for adjusting the horizon by rotating the camera 86, as discussed above. The hidden portion of the mounting plate 80 attached to the camera using a threaded receptacle not visible, but similar to the visible threaded receptacle 84. The wireless module is shown 79. It is shown installed into a slot at the rear of the camera 86 provided for this purpose. Cable 81 provides regulated 12 VDC to the camera 86, which in turn powers the wireless module 79. The regulated 12 VDC is provided by a secondary power supply and power conditioner 82. The input power to the secondary power supply 82 is provided via cable 83, carrying 24 VAC from the primary power supply 73. Typically, the power provided by track power supplies, such as shown here 73, whether AC or DC, is not sufficiently regulated, stable, or low noise sufficient to properly power the camera 86 and wireless module 79. Cameras and wireless technology are sensitive, low voltage, analog electronics. Power from tracks designed for light bulbs is typically inadequate for reliable, safe operation of cameras and wireless electronics. Thus, the novel use of power conditioner 82 is a key enabling component. A typical hook and loop fastener (such as Velcro®) is shown at the end of the lead line 86. These types of fasteners are useful to secure the lighter components inside the enclosure, such as cables or the secondary power supply. 85 is the camera lens.

Figure 5:
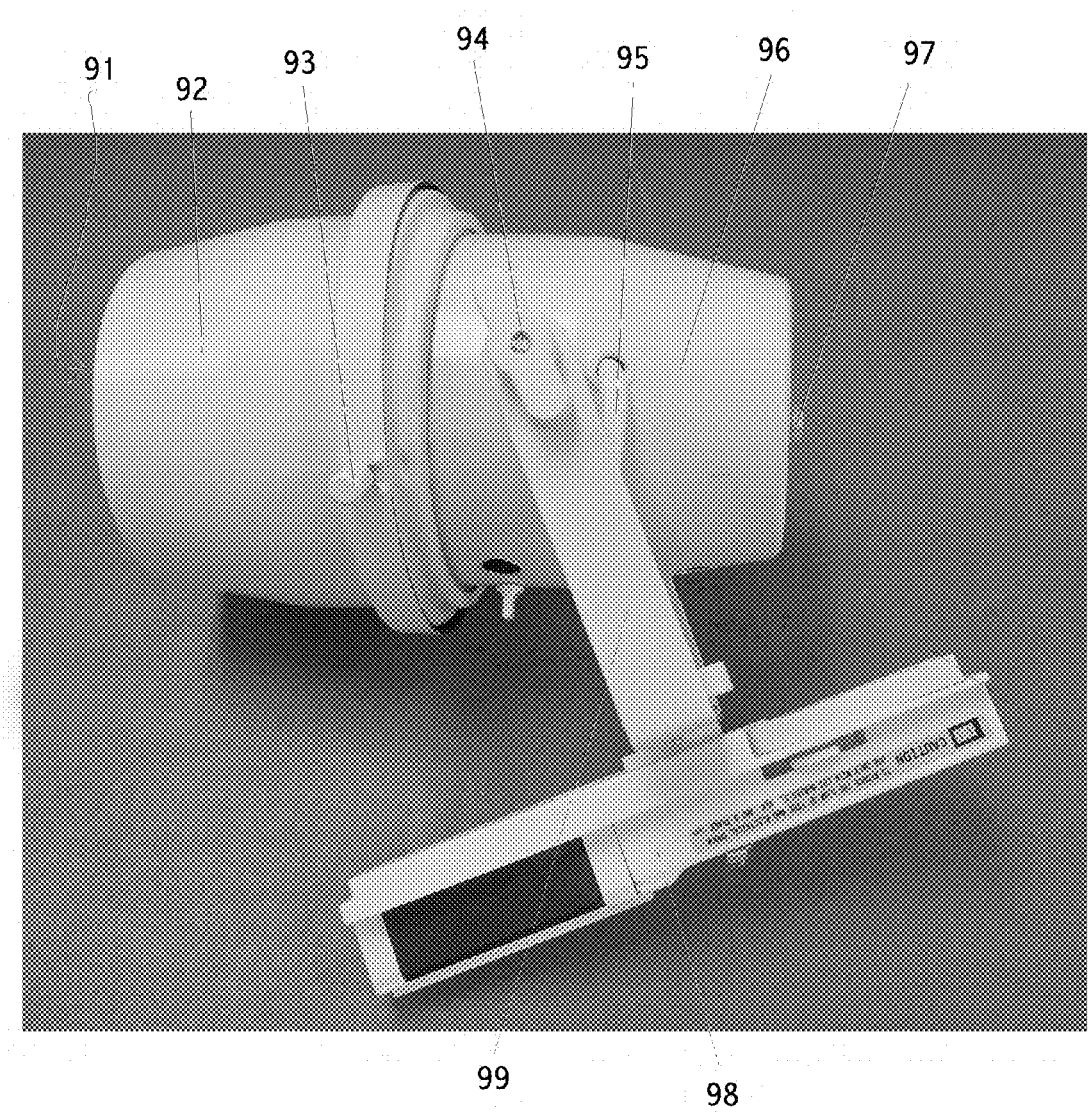
FIG. 5 shows the assembled invention, in one embodiment.

FIG. 5 shows a photographic view of an embodiment. 91 identifies the front of the enclosure. The cover plate, previously described, is located here, out of view. 92 is the front portion of a two-part enclosure. 93 is a thumbscrew allowing easy access by removing the front part of the enclosure 92 from the rear portion of the enclosure 96. 94 shows the rotating joint and thumb clam to permit tilt. 95 show the power cable from the power supply 98 into the enclosure. 96 is the rear portion of the enclosure. 97 identifies the bolt that provides both mechanical mounting of the camera to the enclosure and also horizon correction. The opening in the rear of the enclosure is near 97, but not shown. 98 is the primary power supply and provides mechanical mounting of the invention to a track. 99 is the rotatably attached bracket between the power supply 98 and the rear portion of the enclosure 96. The rotation of this bracket on the power supply supports camera pan adjustment.

FIG. 6 shows an embodiment with a second power supply 6, electrically connected in between the power supply in the base 11 and the video camera 17. The second power supply 6 is physically located within the enclosure 16. Components 7, 8, 9, 10, 16 and 17 are as described above for FIG. 1. Track power, when the track is used for lighting, is often electrically noise or poorly regulated. It is unsuitable for use directly by a video camera. A first power supply located in the base 11 is typically used to provide low voltage to low voltage bulbs. Often, it is simply a transformer that provides, for example, 24 VAC from a track voltage of 120 VAC or 240 VAC. As such, it does not improve the electrical quality of the track power. Thus, in some embodiments, it is advantageous to provide a second power supply 6. This second power supply 6 may convert the voltage from the first power supply 11 to a more desired voltage. It may also filter the power, providing electrically cleaner power. It may also regulate to voltage to assure that it is consistently with the proper operating range for the video camera 17. The second power supply 6 may be only a filter, or may be only a surge protector. The second power 6 may comprise energy storage elements such as a battery, capacitor or inductor. The second power supply may comprise a plurality of components for the purposes stated, such as electronic voltage regulation circuitry. Typical voltages in one embodiment are 120 VAC in the track (track conductors 7, 8 and 9); 24 VAC from the first power supply in the base 11, where this voltage is passed via an electrical cable shown in the Figure as 18; and 12 VDC where this voltage is shown as a cable or connector in the Figure as 5. In one embodiment the second power supply 6 is located within the video camera body, 17. An advantage of one such embodiment is that the base and first power supply 11 may be a standard, approved component; while the second power supply 6 operates at a low voltage and thus does not require approval.

Typically, in use, the track-mounted wireless camera of this invention is deployed in multiple locations in a facility. The track-mounted wireless cameras communicate by the use of one or more wireless access points (APs). However, other forms of wireless communication are possible. In particular, a wireless mesh network is an option.

In one embodiment, the track-mount enclosure described comprises a wireless access point, a wireless mesh node, a repeater, or video data storage. Such capabilities may be in addition to a camera or in place of a camera. These embodiments may permit a wider range, or more flexible location deployment of wireless cameras that is possible using only fixed location access points or wireless mesh nodes.

In one embodiment, components within the enclosure store video data, until retrieved at a later time. For example, a camera may support a plug-in memory card. An advantage of this embodiment is that a large number of cameras may record video. However, until and unless video retrieval is required, no or little wireless bandwidth is required.

In one embodiment the camera fixture is provided with a plurality of antennas (such as a combination of an internal antenna, a protruding antenna, and a remote antenna) so that the system integrator, installer, reseller, or end-user may select the most appropriate antenna for the intended installation location or locations.

A key feature of some embodiments is the ability of the camera fixture to mount in existing lighting tracks installed in an end-user's location, without the need to install cables to the camera or to add mounting hardware in the end-user location.

A key feature of some embodiment is the ability to re-purpose approved lighting components, including any combination of: (i) track-interface module (providing both mechanical mounting and electrical connection to the track conductors); (ii) track-interfaced power supply (providing a lower voltage output than the track conductors); (iii) multi-axis mechanical interface; and (iv) enclosure.

A feature of one embodiment is the modification of an approved enclosure designed for lighting use to accept a video camera.

Embodiments described are non-obvious for a number of reasons, including but not limited to the following: (i) track voltage is generally not useable directly by video cameras; (ii) track power is generally not suitable due to electrical noise and lack of regulation for use directly by video cameras; (iii) low voltage from standard track power supplies, such as 24 VAC, designed to power low voltage lamps, is generally not suitable due to noise and lack of voltage regulation for use directly by video cameras; (iv) mechanical mounting in lighting fixture enclosures is not compatible with video cameras; (v) video cameras are not qualified for use in enclosures as described herein; (vi) no rotation, or horizon correction, is available using standard, prior-art components; (vii) wireless transmission does not penetrate standard metal enclosures; (viii) there is too much heat from standard video cameras using standard enclosures; (ix) components do not have regulatory approval for this application; and (x) moving a wireless around in an end-user environment runs the risk that the camera may be placed such that there is insufficient wireless connectivity—this problem is solved by the use of various antenna configurations in some embodiments.

Embodiments of this invention include all combinations of features and limitations described in the claims.

Suitable components include but are not limited to: Base from LSI Lighting, Series 238; Enclosure from LSI Lighting, Series 238; Track from LSI Lighting, part number 08200-1; Camera from Sony, model SNC-CH140; Power Supply from SecurityStoreUSA, model AT12015-D01; Antenna is an off-the-shelf WiFi antenna with an MMCX male connector; Cover plate fabricated from 1/16 inch thick black polypropylene from Tap Plastics; Rotational bracket fabricated from 3/16 inch thick aluminum with threaded inserts.

DEFINITIONS

Approved for use—means a component is approved by either the component manufacturer or a regulatory agency or tested by a testing entity in compliance with regulatory procedures such that the component may be used in a designated application and marked as meeting one or more approvals.

External cable—a cable to a video camera fixture embodiment with at least one end requiring a connection external to the fixture. Cables that are internal to the fixture, such as a power cable that runs from one element to another element within the fixture (such as cable 18 in FIG. 1) or an antenna cable that connects an antenna that is part of the embodiment (such as cable 78 in FIG. 4) are not external cables. Three examples of external cables are (i) a power cable; (ii) a video cable, and (iii) an IP cable.

Located in the enclosure—We speak of an element, such as video camera, power supply, or antenna being "inside the enclosure" we mean that most of the element is within the 3-dimensional shape defined by the enclosure. Certain portions of the element may extend of the enclosure. For example, some or all of the camera lens, connectors, adjustments, or a portion or all of an antenna may protrude. For a camera body to be "located in an enclosure" at least 80% of the camera body, exclusive of the lens, must be within the 3-dimensional shape defined by the enclosure.

Opening in the cover plate—An opening in the cover plate through which the video camera lens may view may be an open hole, or may comprise one or more suitably optically transparent surfaces. In one embodiment, a user may provide a lens, lens filter, or lens accessory, which may be outside of this opening, partially outside and partially inside this opening, or fully inside this opening.

Project light generally along the axis—this means that one or more light sources, such as LEDs, individually or as a group or sub-group, project a strongest illumination or equal illumination in a direction parallel to the camera's viewing optical axis plus or minus 20 degrees. That is, in plain English, the light source(s) light up what the camera sees.

Substantially the same shape, color and size—we refer to an enclosure for the wireless track camera fixture of an embodiment as being similar to or substantially the same shape color and size of an enclosure that is part of a light of a light fixture. By substantially the same shape we mean the general size and configuration of the enclosure elements, such as one or two cylinders. We exclude variations in mounting hardware, position, internal hardware, openings, electrical connections, edge details and attachments of the enclosure. By substantially the same color we mean a color that a majority people would consider not a different color, when viewed from a typical viewing distance in its intended usage. By substantially the same size we mean encloses the same 3-dimensional volume within 20%. Note that the material of the two enclosures may be substantially different. For example, an enclosure for lights may be metal, while an enclosure for a camera may be plastic.

Track—an elongate mechanical structure or system with power carrying conductors, typically wires or plates running along the elongate track axis, wherein the track is configured to provide mechanical support for and power for one or more re-positionable fixtures that may be placed at one or more locations on the track. Tracks comprise typically one or two-circuits. For a circuit of 120, 240, 24, or other VAC, the circuit typically comprises a hot and neutral conductor. For two circuit tracks, typically a second hot conductor is used, although two more conductors may be used. Circuits may be AC or DC or carry multiple AC phases. Circuits may be phase modulated to effect dimming of light fixtures. Circuits may also carry data, which may or may not share power-carrying conductors. Typically, the removable placement of a fixture on the track effects both mechanical mounting and electrical connection.

Wireless module—a wireless module may be a separate component, or may be integrated with the video camera or may be integrated with the video camera's electronics. A "video camera connected to a wireless module" includes a video camera with inherent, or optional, wireless capability.

Ideal, Ideally, Optimum and Preferred—Use of the words, "ideal," "ideally," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "option," "optional," "mode," "alternative," and "feature," when used in the context of describing this invention, refer specifically to various embodiments of this invention. All descriptions herein are non-limiting, as one trained in the art will appreciate.

We claim:

1. A wireless camera fixture comprising:
a mechanical base adapted to mount in a track, wherein the track is adapted to provide power and mechanical support for at least one track-mounted lighting fixture;
a mechanical enclosure, attached movably to the base;
a video camera, located in the enclosure, powered via the base; and
a wireless module, electrically connected to the video camera, adapted to transmit video data from the camera via a wireless protocol;
wherein the base is a regulatory agency approved power supply for use with a track and a track-mountable light fixture;
one or more visible light LEDs that project light generally along the optical axis of the video camera;
one or more infrared (IR) light LEDs that project light generally along the optical axis of the video camera; and
wherein the visible light LEDs are adapted to be powered from a first track circuit and the IR LEDs are adapted to be powered from a second track circuit.

2. The wireless camera fixture of claim 1 wherein:
the enclosure is adapted to accept one of a plurality of removable cover plates and wherein at least one cover plate provides illumination elements suitable to illuminate a scene visible by the video camera.

3. A wireless camera fixture comprising:
a mechanical base adapted to mount in a track, wherein the track is adapted to provide power and mechanical support for at least one track-mounted lighting fixture;
a mechanical enclosure, attached movably to the base;
a video camera, located in the enclosure, powered via the base; and
a wireless module, electrically connected to the video camera, adapted to transmit video data from the camera via a wireless protocol;
a rotatable mechanical joint such that the video camera may be rotated around its optical axis;
wherein the rotatable mechanical joint also mounts the video camera in the enclosure;
wherein one or more visible light LEDs that project light generally along the optical axis of the video camera;
one or more infrared (IR) light LEDs that project light generally along the optical axis of the video camera; and
wherein the visible light LEDs are adapted to be powered from a first track circuit and the IR LEDs are adapted to be powered from a second track circuit.

4. The wireless camera fixture of claim 1, further comprising:
a second power supply, located inside the enclosure, whose input power comes from the base and whose output power goes to the video camera.

* * * * *